US012291046B2

(12) United States Patent
Tanaka et al.

(10) Patent No.: US 12,291,046 B2
(45) Date of Patent: May 6, 2025

(54) HOLDING UNIT AND LIQUID DISCHARGE DEVICE

(71) Applicant: SEIKO EPSON CORPORATION, Tokyo (JP)

(72) Inventors: Katsumasa Tanaka, Ina (JP); Takuya Ota, Shiojiri (JP); Hiroyuki Santo, Matsumoto (JP); Keita Hanawa, Matsumoto (JP); Kenji Kojima, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 237 days.

(21) Appl. No.: 18/185,188

(22) Filed: Mar. 16, 2023

(65) Prior Publication Data

US 2023/0294438 A1 Sep. 21, 2023

(30) Foreign Application Priority Data

Mar. 17, 2022 (JP) ................................ 2022-042276

(51) Int. Cl.
*B41J 29/377* (2006.01)
*B41J 11/00* (2006.01)

(52) U.S. Cl.
CPC ....... *B41J 29/377* (2013.01); *B41J 11/00222* (2021.01)

(58) Field of Classification Search
CPC B41J 29/377; B41J 11/00222; B41J 2202/08; B41J 2202/19; B41J 2202/20; B41J 2/01
See application file for complete search history.

(56) References Cited

U.S. PATENT DOCUMENTS

2015/0321493 A1* 11/2015 Yoshizawa ............ B41J 29/377 347/17

FOREIGN PATENT DOCUMENTS

| | | | |
|---|---|---|---|
| EP | 2789463 | A | 10/2014 |
| JP | 2009-285870 | A | 12/2009 |
| JP | 2013-120861 | A | 6/2013 |
| JP | 2014-144588 | A | 8/2014 |

* cited by examiner

*Primary Examiner* — Bradley W Thies
(74) *Attorney, Agent, or Firm* — WORKMAN NYDEGGER

(57) ABSTRACT

A holding portion is held by a main body portion. The holding portion includes at least one recording head, a carriage, a cover portion, and a blowing unit. The recording head is capable of discharging ink. The carriage has a bottom wall portion to which at least one recording head is attached, and accommodates the at least one recording head. A cover portion has a facing surface facing the bottom wall portion. The blowing unit blows an air toward the facing surface so that the air reaches the recording head.

7 Claims, 11 Drawing Sheets

HOLDING UNIT AND LIQUID DISCHARGE DEVICE

The present application is based on, and claims priority from JP Application Serial Number 2022-042276, filed Mar. 17, 2022, the disclosure of which is hereby incorporated by reference herein in its entirety.

BACKGROUND

1. Technical Field

The present disclosure relates to a holding unit and a liquid discharge device.

2. Related Art

An inkjet device disclosed in JP-A-2013-120861 includes a carriage, a cover, a head driver integrated circuit, and a heat sink. The cover covers the head, the head driver integrated circuit, and the heat sink. The cover is provided with a fan for taking in air for cooling the heat sink and a vent hole for discharging the air.

In a case of a holding unit including an discharge unit that discharges liquid, such as the carriage in the inkjet device disclosed in JP-A-2013-120861, there is a concern that liquid in the form of mist that has entered from a gap around the discharge unit in the holding unit may adhere to the inside of the holding unit.

SUMMARY

In order to solve the above problems, a holding unit according to the present disclosure is a holding unit held by an device main body, the holding unit including at least one discharge unit configured to discharge liquid, an accommodating unit including an attachment portion to which the at least one discharge unit is attached, the accommodating unit being configured to accommodate the at least one discharge unit, a facing portion having a facing surface facing the attachment portion, and a blowing unit configured to blow a gas toward the facing surface so that the gas reaches the discharge unit.

In order to solve the above problems, a liquid discharge device according to the present disclosure includes a holding unit, an device main body configured to hold the holding unit, and a transport unit configured to transport the medium to a position facing the discharge unit, the holding unit including at least one discharge unit configured to discharge liquid onto a medium, an accommodating unit including an attachment portion to which the at least one discharge unit is attached, the accommodating unit being configured to accommodate the at least one discharge unit, a facing portion having a facing surface facing the attachment portion, and a blowing unit configured to blow a gas toward the facing surface so that the gas reaches the discharge unit.

DESCRIPTION OF EXEMPLARY EMBODIMENTS

Figure 1:
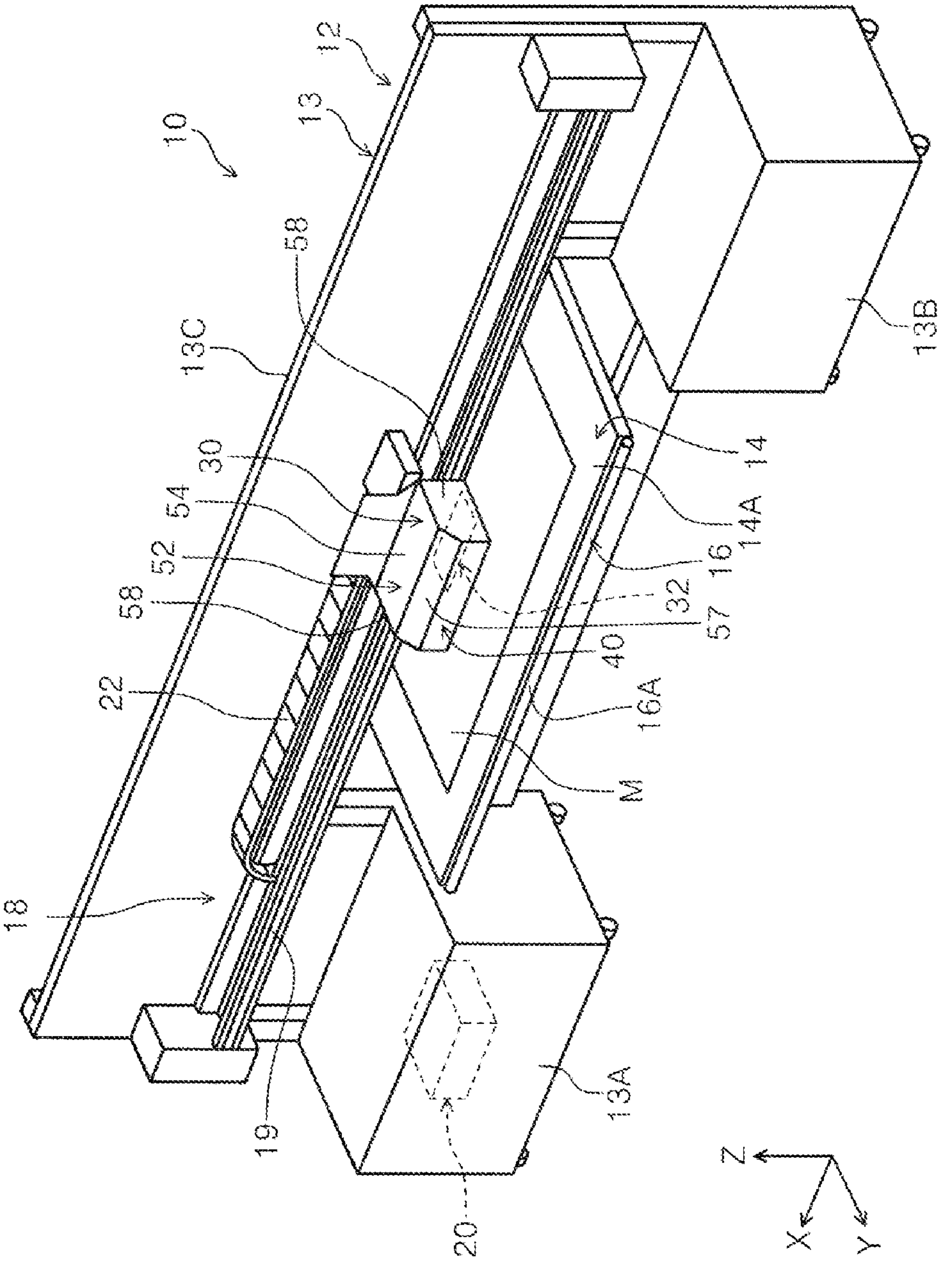
FIG. 1 is a perspective view illustrating an overall configuration of a printer according to a first exemplary embodiment.

Hereinafter, the present disclosure will be schematically described.

A holding unit according to a first aspect is a holding unit held by an device main body, the holding unit including at least one discharge unit configured to discharge liquid, an accommodating unit including an attachment portion to which the at least one discharge unit is attached, the accommodating unit being configured to accommodate the at least one discharge unit, a facing portion having a facing surface facing the attachment portion, and a blowing unit configured to blow a gas toward the facing surface so that the gas reaches the discharge unit.

According to the present aspect, in the holding unit, the blowing unit blows the gas toward the facing surface so that the gas reaches the discharge unit. A flow direction of the gas blown toward the facing surface is changed by colliding with the facing surface, and the gas is dispersed in a plurality of directions. At least a portion of the dispersed gas flows around the at least one discharge unit or to the attachment portion. The gas restricts the flow of the liquid in the form of mist that tends to enter the periphery of the discharge unit from the gap of the attachment portion. In this manner, since the gas flowing to the discharge unit suppresses the entry of the liquid in a mist state into the gap of the attachment portion, it is possible to suppress the liquid from adhering to the inside of the holding unit.

A holding unit according to a second aspect includes, in the first aspect, at least one changing unit configured to change, to a direction toward the attachment portion, a flow direction of the gas blown toward the facing surface.

According to the present aspect, the flow direction of the gas blown toward the facing surface is changed by the changing unit to a direction toward the attachment portion. With this configuration, it is possible to prevent a portion of the gas from staying in the vicinity of the facing surface and to increase the amount of the gas flowing toward the attachment portion. Therefore, it is possible to prevent the liquid entering from the gap from adhering to the inside of the holding unit.

A holding unit according to a third aspect is characterized in that, in the second aspect, a through hole is provided at the changing unit, the through hole extending through the changing unit.

According to the present aspect, in a case where a space portion facing the facing surface is also present on a back side with respect to the changing unit, the gas can reach the space portion on the back side by passing through the through hole, and thus it is possible to suppress a range in which the gas flows from being limited by the changing unit.

A holding unit according to a fourth aspect is characterized in that, in the second aspect or the third aspect, the at least one discharge unit includes a first discharge unit and a second discharge unit which are attached to the attachment portion side by side with each other, and the at least one changing unit is disposed extending across the first discharge unit and the second discharge unit when the attachment portion is viewed in plan view.

A space portion between the first discharge unit and the second discharge unit is narrower than other space portions in the accommodating unit. Therefore, mist of the liquid is likely to stay in the space portion between the first discharge unit and the second discharge unit.

According to the present aspect, since the changing unit is disposed extending across the first discharge unit and the second discharge unit when the attachment portion is viewed in plan view, the gas of which the flow direction is changed by the changing unit also flows between the first discharge unit and the second discharge unit. With this configuration, the gas can be caused to flow toward the mist present between the first discharge unit and the second discharge unit.

A holding unit according to a fifth aspect is characterized in that, in any one of the first to fourth aspects, an electronic element portion is accommodated in the accommodating unit, the electronic element portion being configured to generate heat when the electronic element portion is driven, and a cooling portion is provided at the facing portion, the cooling portion being configured to cool the facing portion.

When the gas inside the holding unit is heated by heat generated by the driving of the electronic element portion, the gas moves as an ascending air current, which may make it difficult for the gas to move toward the attachment portion.

According to the present aspect, since the cooling portion cools the facing portion, the temperature of the gas existing around the facing portion in the holding unit can be reduced, and the ascending air current is less likely to be generated. Therefore, the gas can be easily directed to the attachment portion.

A liquid discharge device according to a sixth aspect includes a holding unit, an device main body configured to hold the holding unit, and a transport unit configured to transport the medium to a position facing the discharge unit, the holding unit including at least one discharge unit configured to discharge liquid onto a medium, an accommodating unit including an attachment portion to which the at least one discharge unit is attached, the accommodating unit being configured to accommodate the at least one discharge unit, a facing portion having a facing surface facing the attachment portion, and a blowing unit configured to blow a gas toward the facing surface so that the gas reaches the discharge unit.

According to the present aspect, similarly to the first aspect, it is possible to suppress the liquid which enters from the gap of the attachment portion from adhering to the inside of the holding unit. With this configuration, since the liquid is prevented from adhering to a coupling portion such as a wiring for operating the discharge unit, it is possible to prevent an operation failure of the discharge unit when the liquid is discharged to the medium.

A liquid discharge device according to a seventh aspect includes, in the sixth aspect, a moving unit provided at the device main body, the moving unit being configured to move the holding unit in a width direction intersecting a transport direction of the medium, and a control unit configured to control the blowing of the gas by the blowing unit, wherein the blowing unit includes a first blowing unit provided on one side in the width direction and a second blowing unit provided on another side in the width direction, with respect to the at least one discharge unit, and when the moving unit moves the holding unit to the one side in the width direction, the control unit operates the second blowing unit and stops operation of the first blowing unit, and when the moving unit moves the holding unit to the other side in the width direction, the control unit operates the first blowing unit and stops the operation of the second blowing unit.

In a case where the moving unit moves the holding unit to one side in the width direction, it is easy for the liquid in a mist state to enter the inside of the holding unit in the periphery of the discharge unit located on one side in the width direction. It is considered that this is because the pressure of the gas acting toward the holding unit from one side in the width direction becomes high. Similarly, in a case where the moving unit moves the holding unit to the other side in the width direction, it is easy for the liquid in a mist state to enter the inside of the holding unit in the periphery of the discharge unit located on the other side in the width direction.

According to the present aspect, in a case where the moving unit moves the holding unit to one side in the width direction, the control unit causes the second blowing unit to blow air. With this configuration, in the holding unit, the gas flowing from the second blowing unit to one side in the width direction via the facing surface restricts the entry of the liquid in a mist state. Similarly, in a case where the moving unit moves the holding unit to the other side in the width direction, the control unit causes the first blowing unit to blow air. With this configuration, in the holding unit, the gas flowing from the first blowing unit to the other side in the width direction via the facing surface restricts the entry of the liquid in a mist state. In this manner, even when the holding unit is moved to either one side or the other side in the width direction, it is possible to prevent the liquid in a mist state from entering the inside of the holding unit.

First Exemplary Embodiment

Hereinafter, a printer 10 and a carriage 40 according to a first exemplary embodiment of the disclosure will be specifically described.

As illustrated in FIG. 1, a printer 10 is an example of a liquid discharge device that performs recording by discharging ink K (FIG. 4), which is an example of liquid, onto a medium M.

The printer 10 includes a main body portion 12 and a holding portion 30. The printer 10 performs recording on the medium M by a recording head 32 which will be described below. Examples of the medium M include cloth and paper. In addition, as an example, the medium M is pulled out from a front surface of the printer 10. Note that an X-Y-Z coordinate system illustrated in each drawing is an orthogonal coordinate system.

An X-direction is a device width direction of the printer 10, and is a horizontal direction. A tip end side of an arrow indicating the X direction is defined as a +X direction, and a base end side of the arrow indicating the X direction is defined as a −X direction. The X direction is an example of a width direction of the medium M.

A Y-direction is the depth direction of the printer 10 and is a horizontal direction. A tip end side of an arrow indicating the Y direction is defined as a +Y direction, and a base end side of the arrow indicating the Y direction is defined as a −Y direction. The +Y direction is an example of a transport direction of the medium M.

The Z direction is an example of a height direction of the printer 10. A tip end side of an arrow indicating the Z direction is defined as a +Z direction, and a base end side of the arrow indicating the Z direction is defined as a −Z direction. The −Z direction is a direction in which gravity acts.

The main body portion 12 is an example of an device main body that holds the holding portion 30 described below. The main body portion 12 is configured to include a base portion 13, a medium support portion 14, a medium transport unit 16, a scanning unit 18, and a control unit 20.

The base portion 13 includes support units 13A and 13B, and a vertical wall unit 13C supported by the support units 13A and 13B.

The medium support portion 14 is provided at the base portion 13 and supports the medium M in the Z direction. An upper surface 14A of the medium support portion 14 is, for example, a plane along the X-Y plane.

The medium transport unit 16 is an example of a transport unit that transports the medium M to a position facing a plurality of recording heads 32 (FIG. 2) which will be described below. The medium transport unit 16 includes a transport roller 16A and a motor (not illustrated). The medium transport unit 16 transports the medium M in the +Y direction by the rotation of the transport roller 16A. In the present exemplary embodiment, the +Y direction corresponds to the main scanning direction.

The scanning unit 18 includes a slide rail 19, a slider, a carriage motor, and a timing belt (not illustrated), and a cable clamp 22.

The slide rail 19 is supported by the vertical wall unit 13C and extends in the X direction. A slider (not illustrated) is provided at the slide rail 19 so as to be movable in the X direction.

The cable clamp 22 supports a cable (not illustrated) coupled to the plurality of recording heads 32.

In the scanning unit 18, the carriage motor drives the timing belt in accordance with an instruction from the control unit 20 to reciprocate the holding portion 30 in the X direction. In other words, the scanning unit 18 scans the plurality of recording heads 32 in the X direction as the sub-scanning direction.

The control unit 20 is configured to include a central processing unit (CPU), a read only memory (ROM), a random access memory (RAM), and a storage, which are not illustrated. The control unit 20 controls the transport of the medium M in the printer 10, the recording operation on the medium M by the plurality of recording heads 32, etc.

Figure 2:
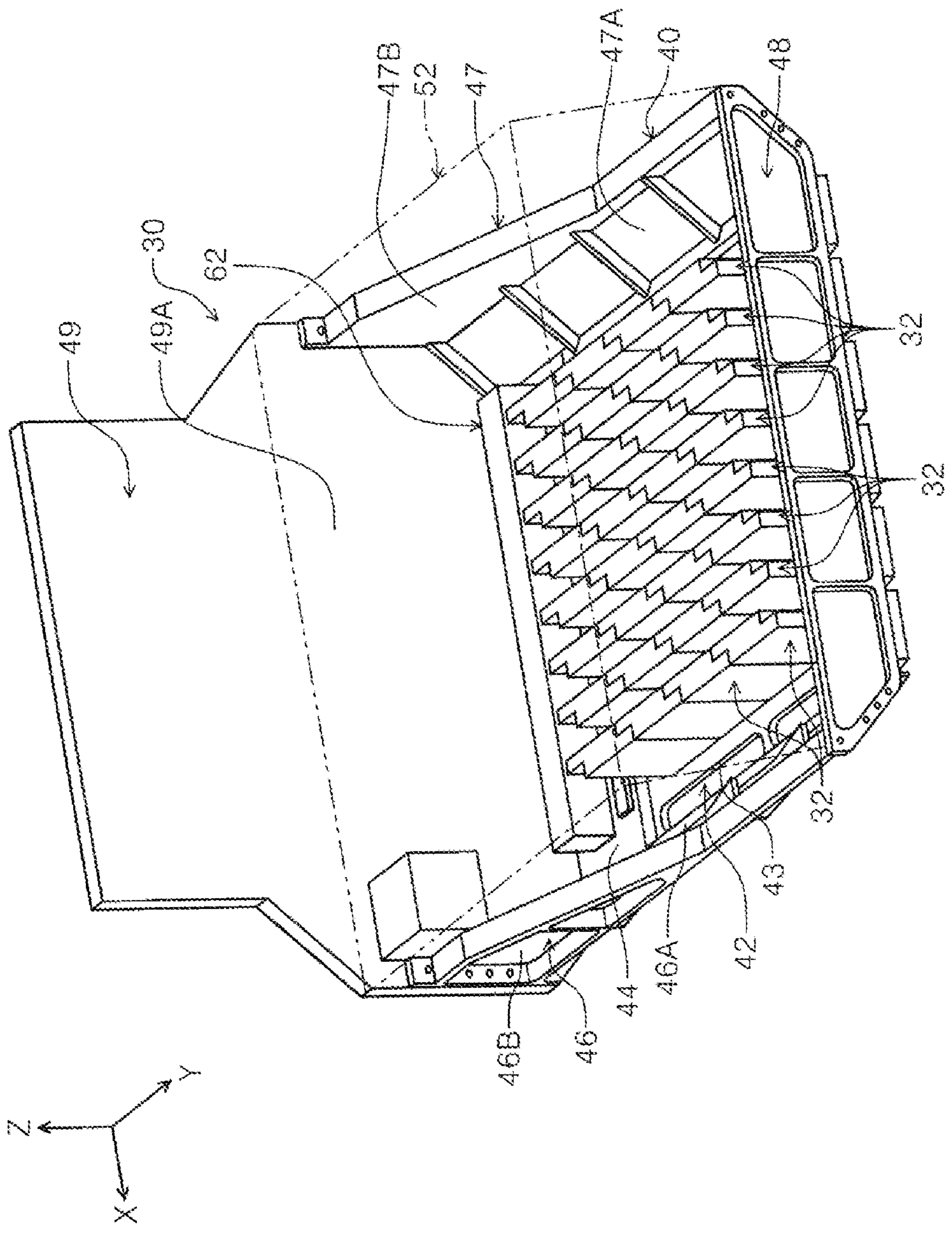
FIG. 2 is a perspective view illustrating an internal structure of a holding portion according to the first exemplary embodiment.

As illustrated in FIG. 2, the holding portion 30 is an example of a holding unit held by the main body 12 (FIG. 1). The holding portion 30 includes the plurality of recording heads 32, the carriage 40, a cover portion 52, and a blowing unit 62.

The recording heads 32 are an example of at least one discharge unit capable of discharging the ink K (FIG. 4) onto the medium M (FIG. 1). Eight recording heads 32 are arranged in the X direction, and four recording heads 32 are arranged in the Y direction. That is, as an example, 32 recording heads 32 are provided at the carriage 40. In addition, the recording heads 32 are provided to face the upper surface 14A or the medium M (FIG. 1) in the Z direction.

Figure 3:
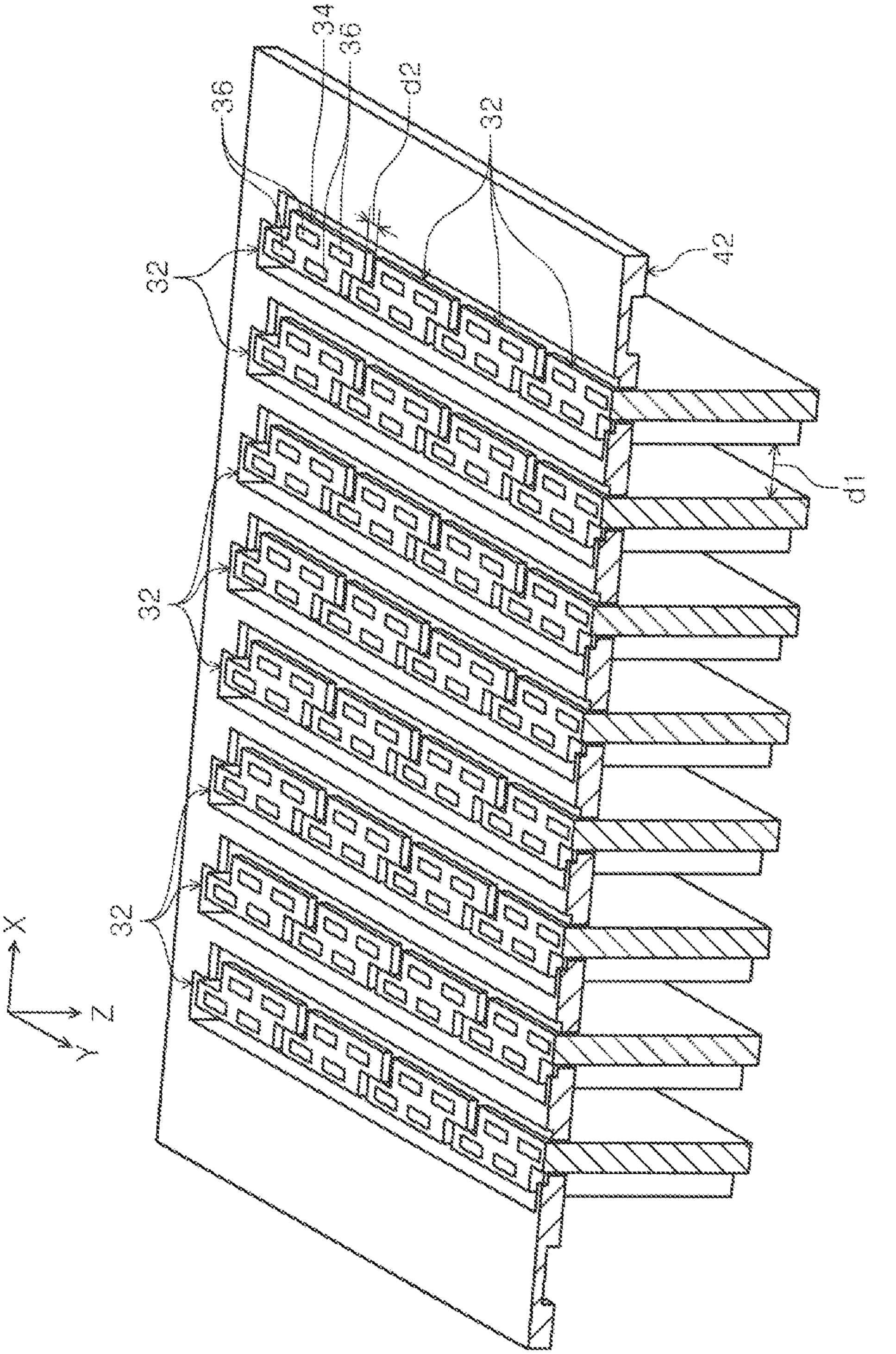
FIG. 3 is a perspective view illustrating a recording head of the holding portion according to the first exemplary embodiment.

As illustrated in FIG. 3, the recording head 32 includes a head main body 34 and a bracket (not illustrated) provided at the head main body 34. The bracket is for attaching the head main body 34 to a bottom wall portion 42 which will be described below.

The head main body 34 includes, for example, four nozzle units 36. The nozzle unit 36 is composed of a plurality of nozzles that are exposed in the −Z direction. The plurality of nozzles are not illustrated. The head main body 34 has a crank-shaped outer shape when viewed in the +Z direction.

The plurality of recording heads 32 are arranged at an interval d1 [mm] in the X direction. In addition, the plurality of recording heads 32 are arranged at an interval d2 [mm] in the Y direction. The distance d2 is smaller than the distance d1.

The ink K (FIG. 4) is supplied to the recording head 32 through a pipe (not illustrated). In addition, a piezoelectric element (not illustrated) and a pressure chamber which accommodates the ink K are provided in the recording head 32. The piezoelectric element is attached to a wall surface of the pressure chamber. When a voltage is applied to the piezoelectric element, the volume of the pressure chamber changes in accordance with the deformation of the piezoelectric element, and thus the ink K is discharged from the nozzle unit 36.

As illustrated in FIG. 2, the carriage 40 has the bottom wall portion 42, side wall portions 46 and 47, a front wall portion 48, and a rear wall portion 49. The carriage 40 is formed in a box shape which is exposed in the +Z direction. The carriage 40 is an example of an accommodating unit that accommodates the plurality of recording heads 32. The carriage 40 can reciprocate in the X direction by the above-described slider.

The bottom wall portion 42 is a plate-like portion having a predetermined thickness in the Z direction. The bottom wall portion 42 has a quadrangular outer shape having sides along the X direction and sides along the Y direction when viewed from the Z direction. The bottom wall portion 42 is an example of an attachment portion to which the plurality of recording heads 32 are attached. The bottom wall portion 42 includes, for example, a first bottom plate 43 and a second bottom plate 44.

The plurality of recording heads 32 are attached to the first bottom plate 43. The plurality of recording heads 32 extend in the +Z direction from the first bottom plate 43.

The second bottom plate 44 is located in the −Y direction with respect to the first bottom plate 43. The blowing unit 62, which will be described below, is attached to the second bottom plate 44.

The side wall portion 46 extends in the +Z direction from an end portion of the bottom wall portion 42 in the +X direction. The sidewall portion 46 includes an inclined wall 46A and a vertical wall 46B. The inclined wall 46A extends in an inclined direction from an end portion of the bottom wall portion 42 in the +X direction toward a position in the +X direction and the +Z direction. The vertical wall 46B extends in the +Z direction from an end portion of the inclined wall 46A in the +Z direction.

The side wall portion 47 extends in the +Z direction from an end portion of the bottom wall portion 42 in the −X direction. The sidewall portion 47 includes an inclined wall 47A and a vertical wall 47B. The inclined wall 47A extends in an inclined direction from an end portion of the bottom wall portion 42 in the −X direction toward a position in the −X direction and the +Z direction. The vertical wall 47B extends in the +Z direction from an end portion of the inclined wall 47A in the +Z direction.

The front wall portion 48 stands upright in the +Z direction at an end portion of the bottom wall portion 42 in the +Y direction. The front wall 48 is coupled to an end portion of the side wall 46 in the +Y direction and an end portion of the side wall 47 in the +Y direction.

The rear wall portion 49 stands upright in the +Z direction at an end portion of the bottom wall portion 42 in the −Y direction. The rear wall portion 49 is coupled to an end portion of the side wall portion 46 in the −Y direction and an end portion of the side wall portion 47 in the −Y direction. A surface of the rear wall portion 49 in the +Y direction is referred to as a front surface 49A.

As illustrated in FIG. 1, the cover portion 52 covers an opening portion of the carriage 40 in the +Z direction. Specifically, the cover portion 52 includes an upper wall 54, a front wall 57, and two side walls 58.

The upper wall 54 is a plate-like wall having a predetermined thickness in the Z direction. The upper wall 54 has a rectangular outer shape in which the dimension in the X direction is longer than the dimension in the Y direction.

The front wall 57 extends in an inclined direction from an end portion of the upper wall 54 in the +Y direction toward a position in the +Y direction and the −Z direction. A surface of the front wall 57 in the −Y direction is referred to as a rear surface 57A (FIG. 4).

The two side walls 58 extend in the −Z direction from both end portions of the upper wall 54 in the X direction.

Figure 4:
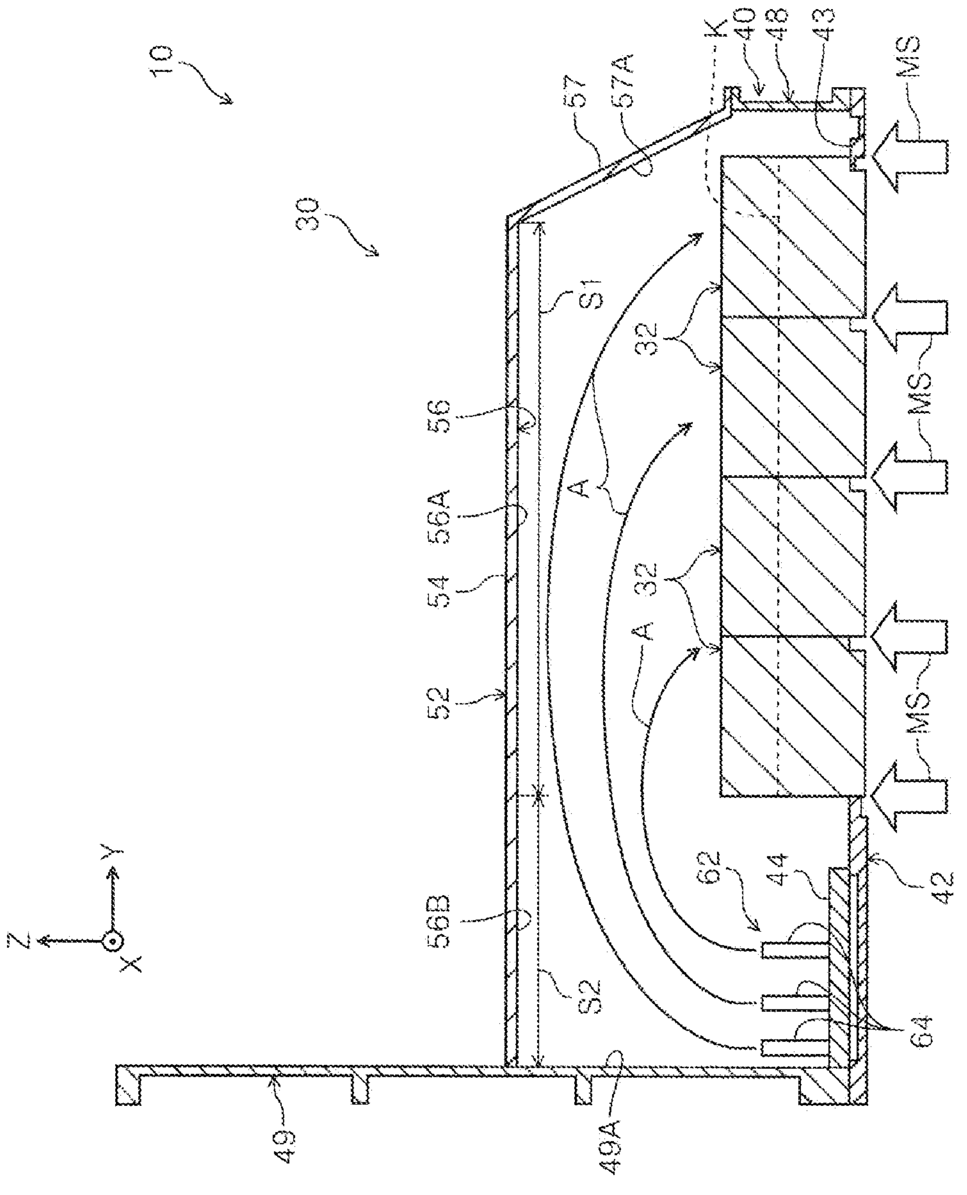
FIG. 4 is a schematic view illustrating a state in which an air current flows inside the holding portion according to the first exemplary embodiment.

As illustrated in FIG. 4, a facing surface 56 is provided at an end portion of the upper wall 54 in the −Z direction. The facing surface 56 is, for example, a plane along the X-Y plane. A portion of the facing surface 56 faces the bottom wall portion 42 in the Z direction with the plurality of recording heads 32 sandwiched therebetween.

In other words, the cover portion 52 is an example of a facing portion having the facing surface 56 facing the bottom wall portion 42.

When viewed from the X direction, a region in the Y direction corresponding to the facing surface 56 is divided into a first region S1 facing the plurality of recording heads 32 in the Z direction and a second region S2 not facing the plurality of recording heads 32 in the Z direction. Here, a portion of the facing surface 56 located inside the first region S1 is referred to as a first facing surface 56A. A portion of the facing surface 56 located inside the second region S2 is referred to as a second facing surface 56B.

The first facing surface 56A faces, in the −Z direction, a portion of the bottom wall portion 42 to which the plurality of recording heads 32 are attached. To be specific, the first facing surface 56A faces, in the −Z direction, the plurality of recording heads 32 and a portion of the bottom wall portion 42 located around the plurality of recording heads 32. The first facing surface 56A does not face the blowing unit 62 described below.

On the other hand, the second facing surface 56B faces, in the −Z direction, a portion of the bottom wall portion 42 to which the plurality of recording heads 32 are not attached. To be specific, the second facing surface 56B faces, in the −Z direction, a portion of the bottom wall portion 42 located in the −Y direction with respect to the plurality of recording heads 32. Further, the second facing surface 56B faces the blowing unit 62 in the −Z direction.

The blowing unit 62 blows an air A toward the facing surface 56 so that the air A reaches the plurality of recording heads 32. The air A is an example of a gas.

Specifically, the blowing unit 62 includes a plurality of air nozzles 64 arranged at intervals in the X direction and the Y direction. The plurality of air nozzles 64 are attached to a portion of the bottom wall portion 42 facing the second facing surface 56B. The plurality of air nozzles 64 blow the air A toward the second facing surface 56B by ejecting the air A in the +Z direction. Each of the plurality of air nozzles 64 has a nozzle opening (not illustrated). The nozzle opening is exposed toward the second facing surface 56B.

Note that an ejection amount of the air A in the plurality of air nozzles 64 is adjusted in advance so that the air A reaches the recording head 32 located at the end in the +Y direction. The blowing unit 62 may include a single air nozzle 64. That is, the blowing unit 62 may include at least one air nozzle 64. In a case where the blowing unit 62 includes the single air nozzle 64, it is preferable that the single air nozzle 64 has a nozzle opening having a rectangular shape in which a dimension in the X direction is greater than a dimension in the Y direction.

Next, operations of the printer 10 and the holding portion 30 according to the first exemplary embodiment will be described.

As illustrated in FIG. 4, a main flow (air flow) of the air A in the holding portion 30 is indicated by an arrow A. The air A flows from the plurality of air nozzles 64 toward the second facing surface 56B. Subsequently, the air A collides with the second facing surface 56B and then flows from the second facing surface 56B toward the first facing surface 56A. Further, the air A flows toward the plurality of recording heads 32 while descending in the −Z direction. The air A ejected from the plurality of air nozzles 64 also includes air that flows in the +Y direction without contacting the second facing surface 56B and reaches the plurality of recording heads 32.

When the air A flows into the holding portion 30 from the blowing unit 62, the pressure in the holding portion 30 becomes positive. A portion of the air A also flows in between the plurality of recording heads 32.

There is a possibility that part of the ink K discharged in the −Z direction from the plurality of recording heads 32 does not become an ink droplet, but becomes the ink K in a mist state, that is, mist MS, and enters the inside of the carriage 40 in the +Z direction from the gap of the bottom wall portion 42.

Here, as described above, the air A flows in the −Z direction in the gap of the bottom wall portion 42 and the peripheral portion of the gap. Since the direction in which the air A flows is opposite to the direction in which the mist MS enters, it is possible to prevent the mist MS from entering the inside of the holding portion 30.

As described above, according to the holding portion 30, the blowing unit 62 blows the air A toward the facing surface 56 so that the air A reaches the plurality of recording heads 32 inside the holding portion 30. The flow direction of the air A blown toward the facing surface 56 is changed by colliding with the facing surface 56, and the air A is dispersed in a plurality of directions. At least a portion of the dispersed air A flows around the plurality of recording heads 32 or to the bottom wall portion 42. Then, the air A restricts the flow of the mist MS that tends to enter the periphery of the plurality of recording heads 32 from the gap of the bottom wall portion 42. In this manner, since the air A flowing to the plurality of recording heads 32 suppresses the entry of the mist MS into the gap of the bottom wall portion 42, it is possible to suppress the adhesion of the ink K to the inside of the holding portion 30.

According to the printer 10, similarly to the holding portion 30, it is possible to suppress the ink K which enters from the gap of the bottom wall portion 42 from adhering to the inside of the holding portion 30. Accordingly, since the ink K is suppressed from adhering to the coupling portion of the wiring, etc. for operating the plurality of recording heads 32, it is possible to suppress the operation failure of the plurality of recording heads 32 in a case of discharging the ink K onto the medium M.

Figure 5:
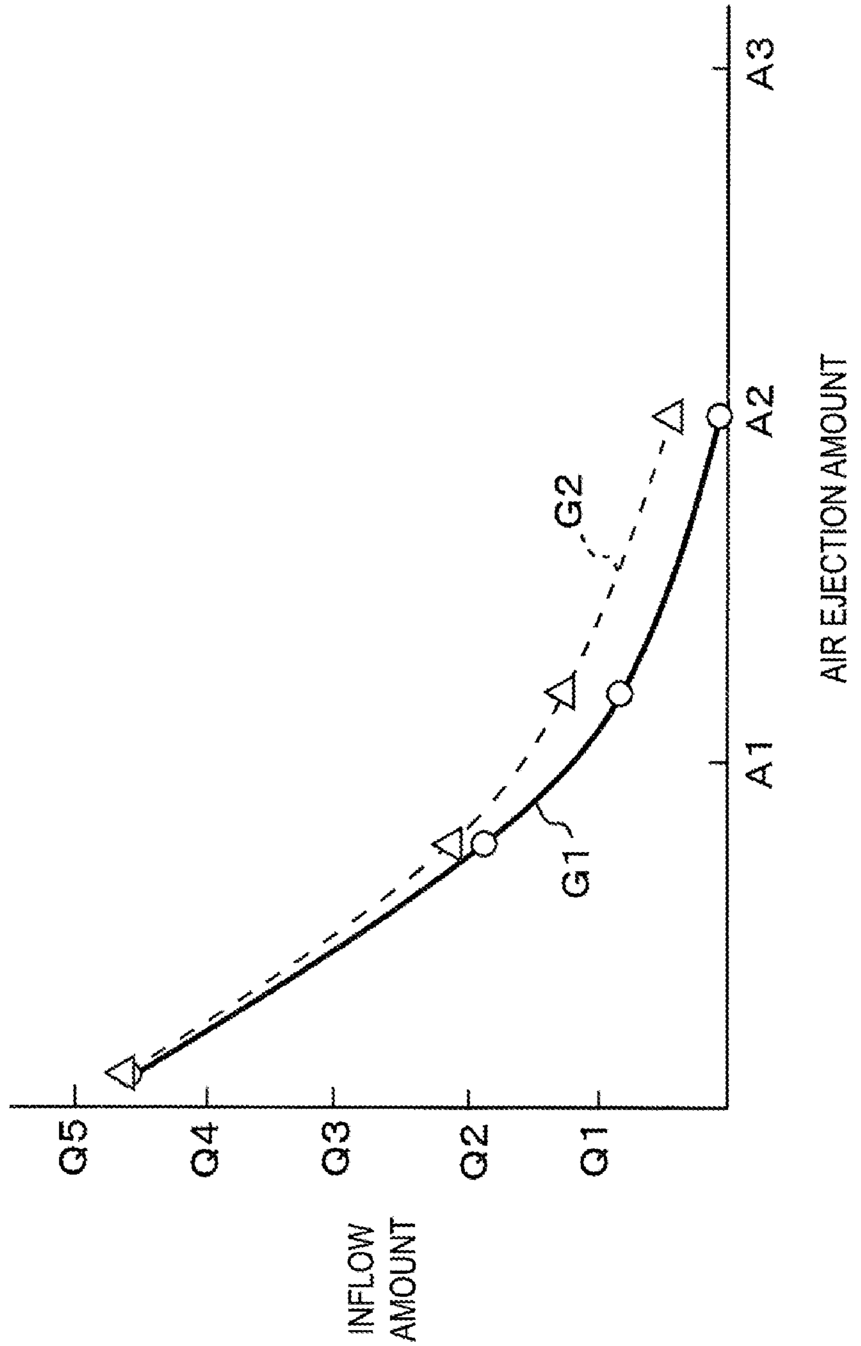
FIG. 5 is a graph illustrating a relationship between an air ejection amount of a blowing unit and an inflow amount of air flowing in from a gap in the holding portion according to the first exemplary embodiment.

In FIG. 5, the relationship between the air ejection amount corresponding to the ejection amount of the air A in the blowing unit 62 and the inflow amount of the mist MS flowing in between the plurality of recording heads 32 from the gap of the bottom wall portion 42 is illustrated by graphs G1 and G2. The greater the number attached to A is, the greater the air ejection amount is. The greater the number attached to Q is, the greater the inflow amount is. The results of the graphs G1 and G2 are results obtained by simulation.

The graph G1 is a result in a case where the air A is blown in the +Z direction using the blowing unit 62 of the present exemplary embodiment inside the holding portion 30. The graph G2 is a result in a case where the air A is blown in the −Z direction from an air nozzle (not illustrated) inside the holding portion 30 as a comparative example. When the graphs G1 and G2 are compared, in a case where the air ejection amount is the same, the inflow amount of the mist MS to the inside of the holding portion 30 is smaller in the present exemplary embodiment in which the air A is blown in the +Z direction than in the comparative example in which the air A is blown in the −Z direction.

Second Exemplary Embodiment

Hereinafter, the printer 10 and a holding portion 70 according to a second exemplary embodiment will be specifically described. The same configurations as those of the printer 10 and the holding portion 30 according to the first exemplary embodiment will be denoted by the same reference numerals and signs, and description thereof will be omitted.

Figure 6:
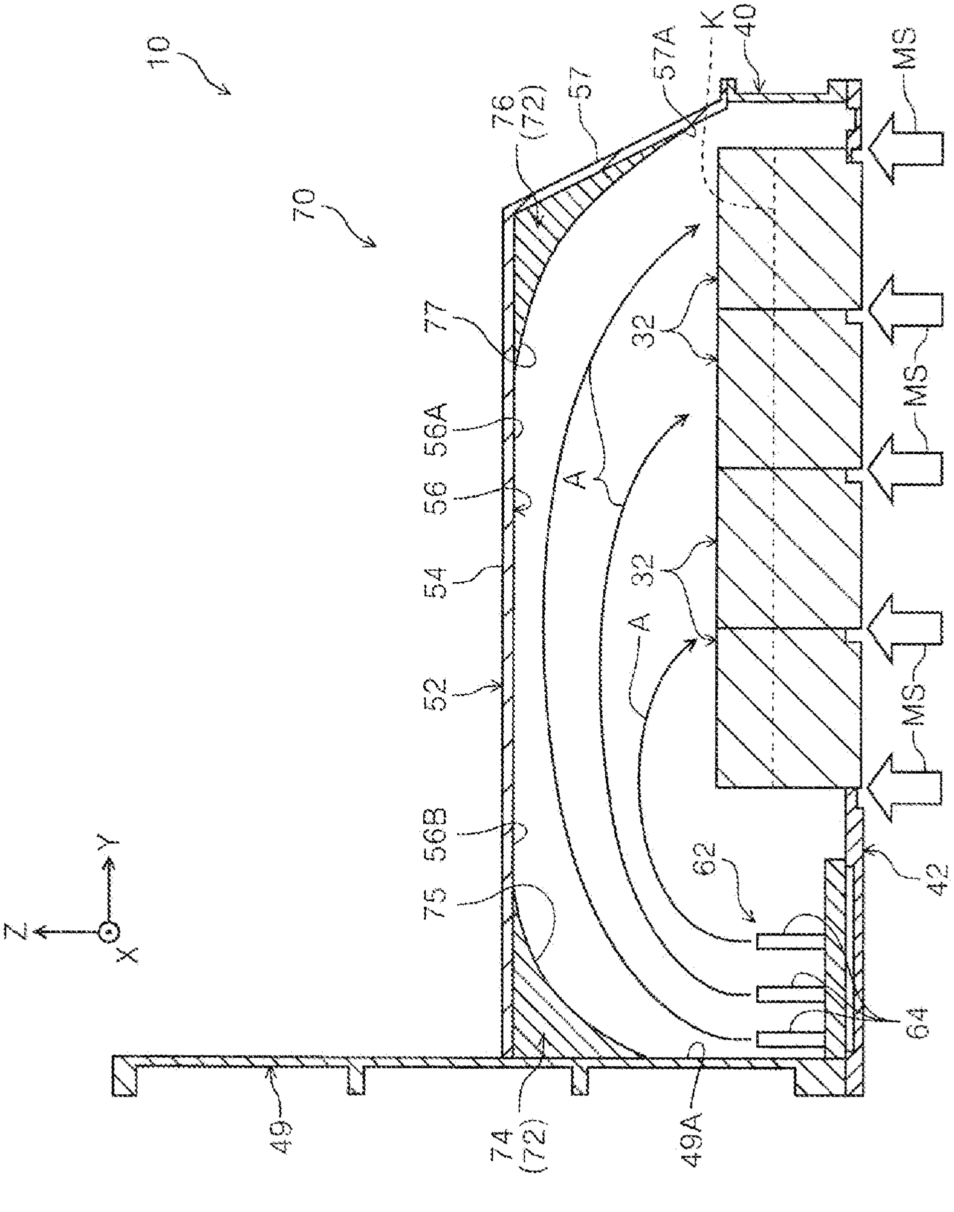
FIG. 6 is a schematic view illustrating a state in which an air current flows inside a holding portion according to a second exemplary embodiment.

As illustrated in FIG. 6, the holding portion 70 is provided in place of the holding portion 30 (FIG. 2) in the printer 10 (FIG. 1). The configurations other than the holding portion 70 is basically the same as those of the printer 10. Specifically, the holding portion 70 further includes a changing unit 72 in addition to the configuration of the holding portion 30. The holding portion 70 is an example of a holding unit held by the main body portion 12 (FIG. 1).

The changing unit 72 is at least one portion that can change the flow direction of the air A blown toward the facing surface 56 to a direction toward the bottom wall portion 42. The changing unit 72 includes, for example, a first changing member 74 and a second changing member 76.

The first changing member 74 is provided extending across a portion of the front surface 49A and an end portion of the second facing surface 56B in the −Y direction inside the holding portion 70. The first changing member 74 is a member having a predetermined thickness in the X direction. The first changing member 74 has an upstream guide surface 75 including an arc-shaped curved surface when viewed in the X direction.

The upstream guide surface 75 is a curved surface recessed toward a corner portion formed by the front surface 49A and the second facing surface 56B. The upstream guide surface 75 is a curved surface such that the direction in which a tangent line at each point of the upstream guide surface 75 extends changes from the +Z direction to the +Y direction toward the +Y direction when viewed from the X direction. In other words, the upstream guide surface 75 guides, in the +Y direction, the air A that has risen in the +Z direction toward the upstream guide surface 75.

The second changing member 76 is provided extending across an end portion of the rear surface 57A in the +Z direction and an end portion of the first facing surface 56A in the +Y direction inside the holding portion 70. The second changing member 76 is a member having a predetermined thickness in the X direction. The second changing member 76 has a downstream guide surface 77 including an arc-shaped curved surface as viewed in the X direction.

The downstream guide surface 77 is a curved surface recessed toward a corner portion formed by the rear surface 57A and the first facing surface 56A. The downstream guide surface 77 is a curved surface such that the direction of a tangent line at each point of the downstream guide surface 77 extends changes from the +Y direction to the −Z direction toward the +Y direction when viewed from the X direction. In other words, the downstream guide surface 77 guides, in the +Y direction, the air A flowing toward the downstream guide surface 77 in the −Z direction, that is, toward the plurality of recording heads 32 and the bottom wall portion 42. As viewed in the X direction, the curvature of the downstream guide surface 77 is, for example, smaller than the curvature of the upstream guide surface 75.

Next, operation of the holding portion 70 according to the second exemplary embodiment will be described with reference to FIG. 6.

The air A blown in the +Z direction from the blowing unit 62 toward the second facing surface 56B is directed in the +Y direction by being guided by the upstream guide surface 75. Further, the air A flowing in the +Y direction is guided by the downstream guide surface 77 to flow in the −Z direction. Accordingly, the air A reaches the plurality of recording heads 32. Here, the air A can suppress the mist MS from entering the inside of the holding portion 70.

In this manner, according to the holding portion 70, the flow direction of the air A blown toward the facing surface 56 is changed to the direction toward the bottom wall portion 42 by the changing unit 72. Accordingly, it is possible to suppress a portion of the air A from staying in the vicinity of the facing surface 56 and to increase the amount of the air A flowing toward the bottom wall portion 42. Therefore, it is possible to suppress the ink K (mist MS) entering from the gap from adhering to the inside of the holding portion 70.

Third Exemplary Embodiment

Hereinafter, the printer 10 and a holding portion 80 according to a third exemplary embodiment will be specifically described. The same configurations as those of the printer 10 and the holding portions 30 and 70 according to the first and second exemplary embodiments will be denoted by the same reference numerals and signs, and description thereof will be omitted.

Figure 7:
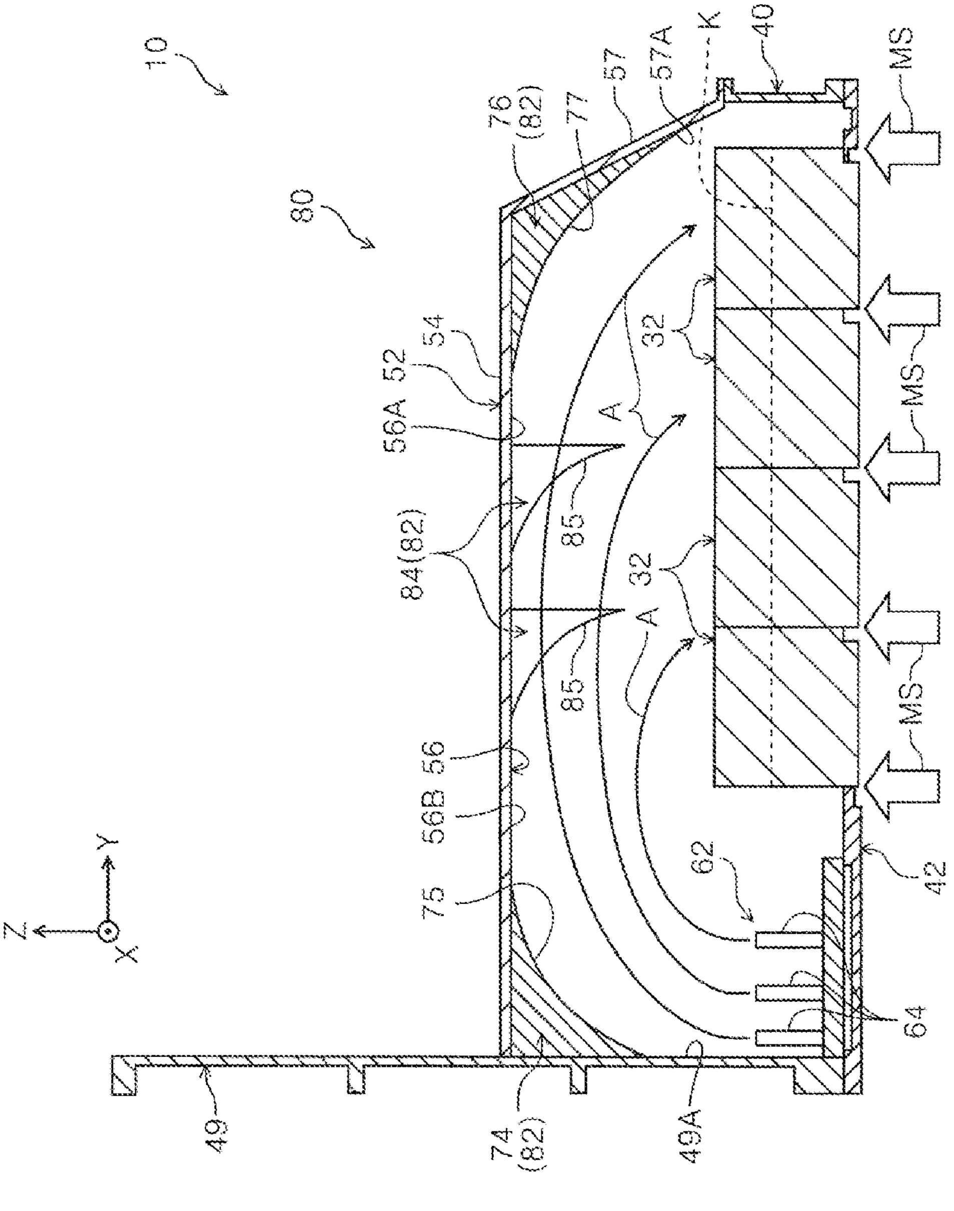
FIG. 7 is a schematic view illustrating a state in which an air current flows inside the holding portion according to a third exemplary embodiment.

As illustrated in FIG. 7, the holding portion 80 is provided in place of the holding portion 30 (FIG. 2) in the printer 10

(FIG. 1). The configurations other than the holding portion 80 is basically the same as those of the printer 10. Specifically, the holding portion 80 includes a changing unit 82 instead of the changing unit 72 in the configuration of the holding portion 70 (FIG. 6). The holding portion 80 is an example of a holding unit held by the main body portion 12 (FIG. 1).

The changing unit 82 is at least one portion that can change the flow direction of the air A blown toward the facing surface 56 to a direction toward the bottom wall portion 42. The changing unit 82 includes, for example, a plurality of the first changing members 74, a plurality of the second changing members 76, and a plurality of third changing members 84.

The plurality of third changing members 84 are provided at the center portion of the facing surface 56 in the Y direction inside the holding portion 80. That is, the plurality of third changing members 84 are located between the first changing member 74 and the second changing member 76 in the Y direction. The plurality of third changing members 84 are located in the +Z direction with respect to the plurality of recording heads 32. The third changing member 84 is a member having a predetermined thickness in the X direction. The third changing member 84 has a guide surface 85 including an arc-shaped curved surface when viewed in the X direction.

The guide surface 85 is a curved surface that is recessed toward a position in the +Y direction and the +Z direction. The guide surface 85 is a curved surface such that the direction of a tangent line at each point of the guide surface 85 extends changes from the +Y direction to the −Z direction toward the +Y direction when viewed from the X direction. In other words, the guide surface 85 guides, in the −Z direction, the air A flowing in the +Y direction toward the downstream guide surface 77.

Figure 8:
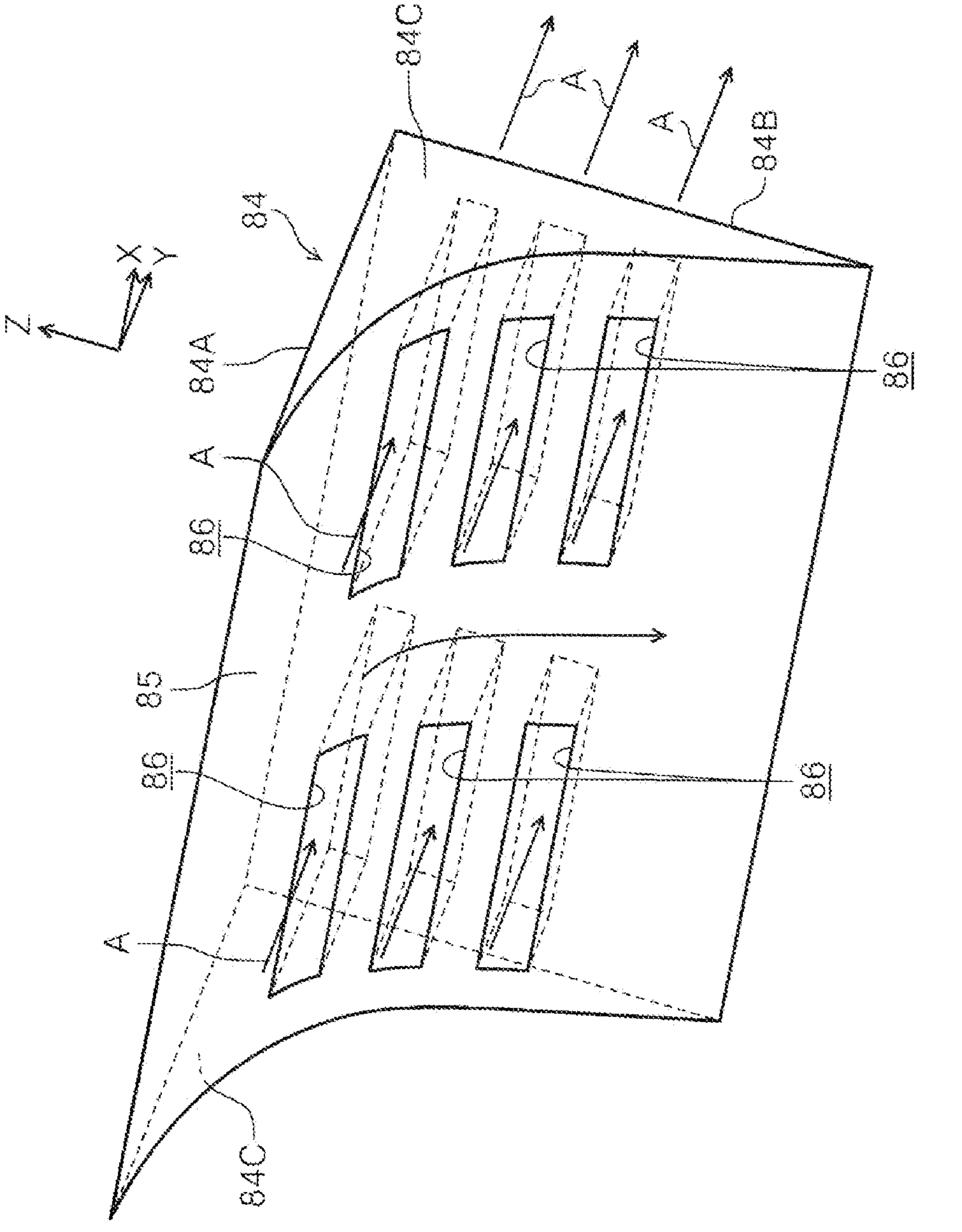
FIG. 8 is a perspective view of a changing member according to the third exemplary embodiment.

As illustrated in FIG. 8, the third changing member 84 is a block-shaped member having a predetermined thickness in the X direction. The third changing member 84 includes, for example, an upper surface 84A, a vertical surface 84B, two side surfaces 84C, and a guide surface 85.

The upper surface 84A is a surface along the X-Y plane. The upper surface 84A is attached to the facing surface 56 (FIG. 7). The vertical surface 84B is a surface along the X-Z plane. The vertical surface 84B extends in the −Z direction from an end portion in the +Y direction of the upper surface 84A. The two side surfaces 84C couple both end portions of each of the upper surface 84A and the vertical surface 84B in the X direction. The two side surfaces 84C are surfaces along the Y-Z plane.

The guide surface 85 extends from an end of the upper surface 84A in the −Y direction to an end of the vertical surface 84B in the −Z direction.

The changing unit 82 is provided with, for example, a plurality of through holes 86 that extend through the changing unit 82 in the Y direction. In the present exemplary embodiment, as an example, six through holes 86 are provided.

The six through holes 86 extend from the guide surface 85 to the vertical surface 84B. Each of the six through holes 86 is formed in a rectangular shape in which the dimension in the X direction is longer than the dimension in the Z direction when viewed in the +Y direction. For example, two through holes 86 are arranged in the X direction and three through holes 86 are arranged in the Z direction at intervals. In the guide surface 85, the air A can be guided in the −Z direction in a portion located between two through holes 86 adjacent to each other in the X direction and a portion located outside the two through holes 86 in the X direction.

In this manner, in the changing unit 82, both the guide of the air A by the guide surface 85 and the flow of the air A in the +Y direction in the six through holes 86 are possible.

Figure 9:
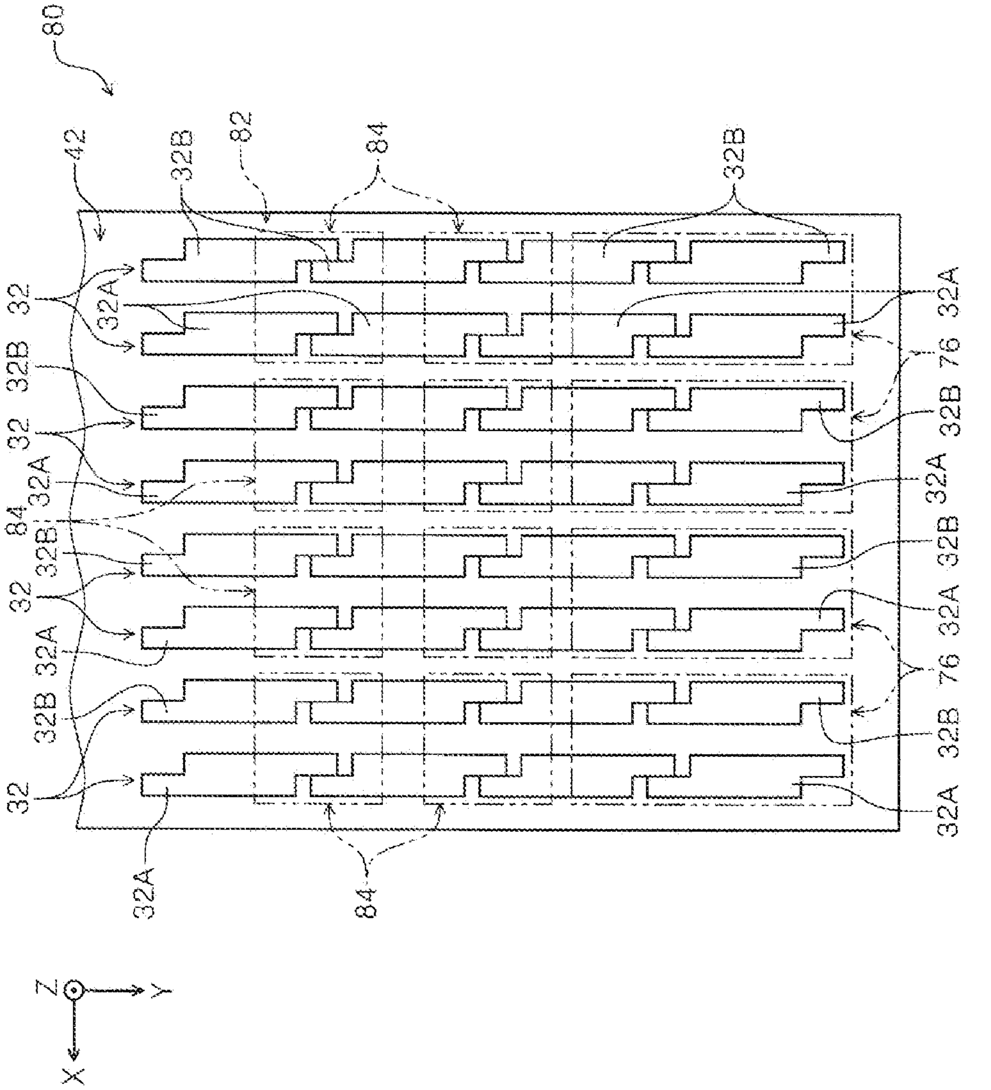
FIG. 9 is a plan view of a bottom wall of the holding portion and a recording head according to the third exemplary embodiment.

FIG. 9 illustrates a state in which the inside of the holding portion 80 is viewed in the −Z direction from the facing surface 56 (FIG. 7). The plurality of recording heads 32 include a first recording head 32A and a second recording head 32A which is attached to the bottom wall portion 42 side by side with the first recording head 32B in the X direction. In the present exemplary embodiment, as an example, the first recording head 32A and the second recording head 32B are alternately arranged in the X direction. In addition, as an example, the configuration of the first recording head 32A and the configuration of the second recording head 32B have the same configuration.

The first recording head 32A is an example of a first discharge unit. The plurality of first recording heads 32A are arranged in the Y direction.

The second recording head 32B is an example of a second discharge unit. The plurality of second recording heads 32B are arranged in the Y direction.

The plurality of second changing members 76 are disposed extending across the first recording head 32A and the second recording head 32B in the X direction in plan view of the bottom wall portion 42 in the −Z direction. The plurality of second changing members 76 are disposed extending across, in the Y direction, two first recording heads 32A arranged in the Y direction and two second recording heads 32B arranged in the Y direction in plan view of the bottom wall portion 42 in the −Z direction.

The plurality of third changing members 84 are disposed extending across the first recording head 32A and the second recording head 32B in the X direction in plan view of the bottom wall portion 42 in the −Z direction. In addition, the plurality of third changing members 84 are disposed extending across, in the Y direction, two first recording heads 32A arranged in the Y direction and two second recording heads 32B arranged in the Y direction in plan view of the bottom wall portion 42 in the −Z direction.

Next, operation of the holding portion 80 according to the third exemplary embodiment will be described with reference to FIGS. 7, 8, and 9.

According to the holding portion 80, in a case where a space portion facing the facing surface 56 is also present in the +Y direction which is the back side with respect to the third changing member 84, the air A can reach the space portion on the back side by passing through the plurality of through holes 86 of the third changing member 84, and thus it is possible to suppress the range in which the air A flows from being limited by the third changing member 84.

A space portion between the first recording head 32A and the second recording head 32B is narrower than other space portions in the carriage 40. Therefore, the mist MS is likely to stay in the space portion between the first recording head 32A and the second recording head 32B.

Here, according to the holding portion 80, the plurality of second changing members 76 and the plurality of third changing members 84 are disposed extending across the first recording head 32A and the second recording head 32B in plan view of the bottom wall portion 42 in the −Z direction. Therefore, the air A of which the flow direction is changed by the plurality of second changing members 76 and the plurality of third changing members 84 also flows between the first recording head 32A and the second recording head 32B. Accordingly, it is possible to flow the air A toward the mist MS existing between the first recording head 32A and the second recording head 32B.

In addition, in the present exemplary embodiment, since the air A can flow between the plurality of first recording heads 32A arranged in the Y direction and between the plurality of second recording heads 32B arranged in the Y direction, it is possible to prevent the mist MS from entering.

Fourth Exemplary Embodiment

Hereinafter, the printer 10 and a holding portion 90 according to a fourth exemplary embodiment will be specifically described. The same configurations as those of the printer 10 and the holding portions 30, 70, and 80 according to the first, second, and third exemplary embodiments will be denoted by the same reference numerals and signs, and description thereof will be omitted.

Figure 10:
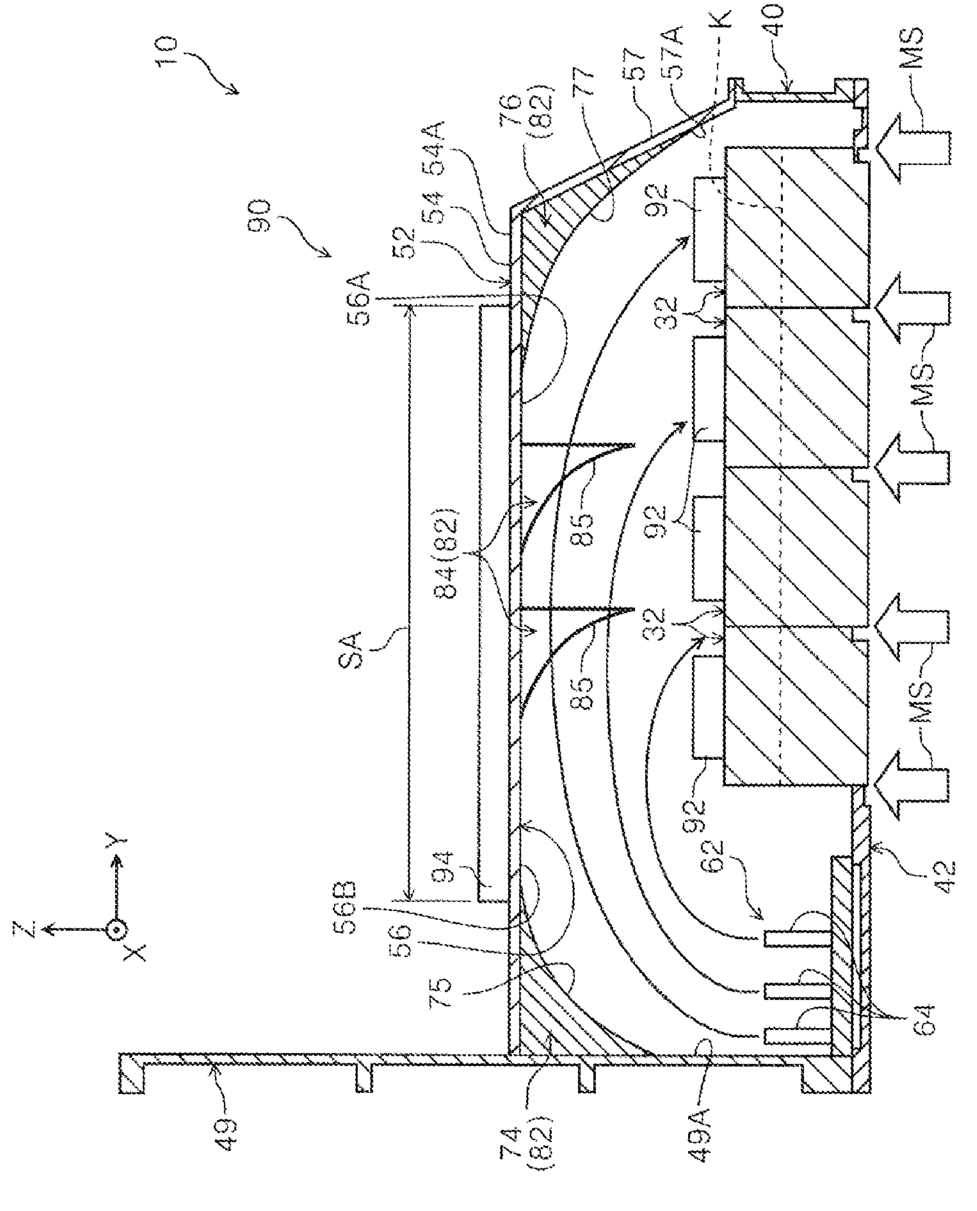
FIG. 10 is a schematic view illustrating a state in which an air current flows inside the holding portion according to a fourth exemplary embodiment.

As illustrated in FIG. 10, the holding portion 90 is provided in place of the holding portion 30 (FIG. 2) in the printer 10 (FIG. 1). The configurations other than the holding portion 90 is basically the same as those of the printer 10. Specifically, the holding portion 90 has a configuration in which a drive substrate 92 and a Peltier cooler 94 are further added to the configuration of the holding portion 80 (FIG. 7). The holding portion 90 is an example of a holding unit held by the main body portion 12 (FIG. 1).

The drive substrate 92 is accommodated in the carriage 40.

The drive substrate 92 is an example of an electronic element portion that generates heat when being driven. As an example, the drive substrate 92 is coupled to an end portion of each recording head 32 in the +Z direction. The drive substrate 92 can be energized from a power supply unit (not illustrated) via wiring.

The Peltier cooler 94 is provided at the cover portion 52.

The Peltier cooler 94 is an example of a cooling portion that cools the cover portion 52. The Pertier cooler 94 is attached to an upper surface 54A of the upper wall 54 in the +Z direction, for example. When a region SA of the upper surface 54A to which the Pertier cooler 94 is attached is projected in the −Z direction, a portion of the plurality of recording heads 32 is located inside the region SA. The Peltier cooler 94 can be energized from a power supply unit (not illustrated) via wiring. When energized, the Peltier cooler 94 absorbs heat from the upper wall 54 to cool the air inside the holding portion 90.

Next, operation of the holding portion 90 according to the fourth exemplary embodiment will be described with reference to FIG. 10.

When the air A inside the holding portion 90 is heated by the heat generated by the driving of the drive substrate 92, the air A moves in the +Z direction as an ascending air current, and there is a possibility that the air A is not easily directed to the bottom wall portion 42.

Here, according to the holding portion 90, since the Peltier cooler 94 cools the cover portion 52, the temperature of the air A existing around the cover portion 52 in the inside of the holding portion 90 can be reduced, and an ascending air current is less likely to be generated. Therefore, the air A can be easily directed toward the bottom wall portion 42.

Fifth Exemplary Embodiment

Hereinafter, a printer 100 and a holding portion 110 according to a fifth exemplary embodiment will be specifically described. The same configurations as those of the printer 10 and the holding portions 30, 70, 80, and 90 according to the first, second, third, and fourth exemplary embodiments will be denoted by the same reference numerals and signs, and description thereof will be omitted.

Figure 11:
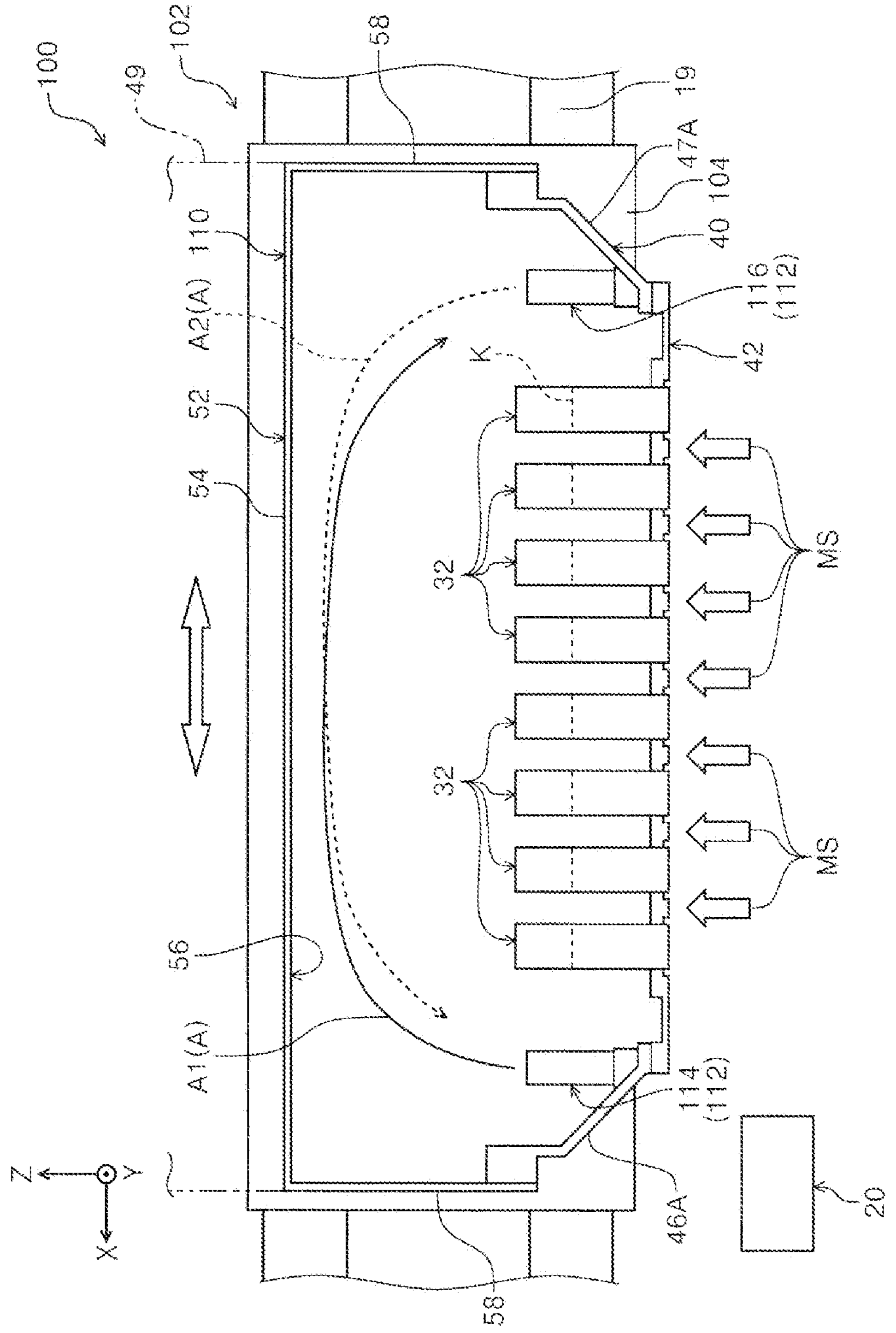
FIG. 11 is a schematic view illustrating a state in which an air current flows inside the holding portion according to a fifth exemplary embodiment.

As illustrated in FIG. 11, the printer 100 includes a moving unit 102, a control unit 20, and a holding portion 110. The configurations of the printer 100 other than the moving unit 102 and the holding portion 110 is the same as those of the printer 10 (FIG. 1).

The moving unit 102 is provided at the main body portion 12 (FIG. 1), and is capable of moving the holding portion 110 in the X direction intersecting the +Y direction of the medium M. Specifically, the moving unit 102 includes the slide rail 19, a slider 104, a carriage motor and a timing belt (not illustrated), and the cable clamp 22 (FIG. 1).

The slider 104 is provided so as to be movable from one to the other of the +X direction and the −X direction along the slide rail 19. The rear wall portion 49 of the holding portion 110 is attached to the slider 104. Accordingly, the holding portion 110 can reciprocate in the X direction.

The moving unit 102 reciprocates the holding portion 110 along the X direction by the carriage motor driving the timing belt in accordance with an instruction from the control unit 20. In other words, the moving unit 102 scans the plurality of recording heads 32 in the X direction.

The holding portion 110 is an example of a holding unit held by the main body portion 12 via the moving unit 102. The holding portion 110 includes the plurality of recording heads 32, the carriage 40, the cover portion 52, and a blowing unit 112. As an example, the holding portion 110 is not provided with the blowing unit 62 (FIG. 2).

The blowing unit 112 blows the air A toward the facing surface 56 so that the air A reaches the plurality of recording heads 32. Specifically, at least one blowing unit 112 includes a first blowing unit 114 provided in the +X direction which is one side of the X direction and a second blowing unit 116 provided in the −X direction which is the other side of the X direction with respect to the plurality of recording heads 32.

The first blowing unit 114 includes, for example, a plurality of air nozzles (not illustrated) arranged at intervals in the Y direction. The first blowing unit 114 is attached to the inclined wall 46A and is capable of ejecting the air A in the +Z direction. The first blowing unit 114 faces the end portion of the facing surface 56 in the +X direction in the Z direction. The ejection amount of the air A in the first blowing unit 114 is adjusted in advance so that the air A reaches the recording head 32 located at the end in the −X direction.

As an example, the second blowing unit 116 has the same configuration as that of the first blowing unit 114, and only an arrangement thereof is different. The second blowing unit 116 is attached to the inclined wall 47A and is capable of ejecting the air A in the +Z direction. The second blowing unit 116 faces the end portion of the facing surface 56 in the −X direction in the Z direction. The ejection amount of the air A in the second blowing unit 116 is adjusted in advance so that the air A reaches the recording head 32 located at the end in the +X direction.

The control unit 20 controls the blowing of the air A by at least one blowing unit 112, that is, the operation of the first blowing unit 114 and the operation of the second blowing unit 116. Specifically, when the moving unit 102 moves the holding portion 110 in the +X direction, the control unit 20 causes the second blowing unit 116 to blow air. That is, the control unit 20 causes the second blowing unit 116 to blow the air A as indicated by a broken-line arrow A2. In other words, when the moving unit 102 moves the holding portion 110 in the +X direction, the control unit 20 operates the second blowing unit 116 and stops the operation of the first blowing unit 114.

Further, when the moving unit 102 moves the holding portion 110 in the −X direction, the control unit 20 causes the first blowing unit 114 to blow air. That is, the first blowing unit 114 is caused to blow the air A as indicated by a solid arrow A1. In other words, when the moving unit 102 moves the holding portion 110 in the −X direction, the control unit 20 operates the first blowing unit 114 and stops the operation of the second blowing unit 116.

Next, the operation of the printer 100 and the holding portion 110 according to the fifth exemplary embodiment will be described with reference to FIG. 11. The air existing outside the holding portion 110 is simply referred to as air without being denoted by the reference sign A. Thus, the air existing outside is distinguished from the air A flowing inside the holding portion 110.

When the moving unit 102 moves the holding portion 110 in the +X direction, the mist MS easily enters the inside of the holding portion 110 in the periphery of the recording head 32 located in the +X direction. It is considered that this is because the pressure of the air acting from the +X direction toward the holding portion 110 increases. Similarly, when the moving unit 102 moves the holding portion 110 in the −X direction, the mist MS easily enters the inside of the holding portion 110 in the periphery of the recording head 32 located in the −X direction.

Here, according to the printer 100, when the moving unit 102 moves the holding portion 110 in the +X direction, the control unit 20 causes the second blowing unit 116 to blow air. Accordingly, inside the holding portion 110, an air A2 flowing in the +X direction from the second blowing unit 116 via the facing surface 56 restricts the entry of the mist MS.

Similarly, when the moving unit 102 moves the holding portion 110 in the −X direction, the control unit 20 causes the first blowing unit 114 to blow air. Accordingly, inside the holding portion 110, the air A1 flowing in the −X direction from the first blowing unit 114 via the facing surface 56 restricts the entry of the mist MS. In this manner, even when the holding portion 110 is moved in any of the +X direction and the −X direction, it is possible to suppress the mist MS from entering the inside of the holding portion 110.

That is, the control unit 20 can operate the first blowing unit 114 or the second blowing unit 116 in accordance with the direction in which the moving unit 102 moves the holding portion 110. Accordingly, as compared to a case where both the first blowing unit 114 and the second blowing unit 116 operate, it is possible to suppress the action of suppressing the entry of the mist MS into the holding portion 110 from being hindered due to the interference of the air A ejected from one of the first blowing unit 114 and the second blowing unit 116 with the air A ejected from the other.

Modification Example

The printers 10 and 100 and the holding portions 30, 70, 80, 90, and 110 according to the first, second, third, fourth, and fifth exemplary embodiments of the disclosure are based on a configuration having the configurations as described above, but it is of course possible to change, omit, or combine partial configurations without departing from the scope of the disclosure. Hereinafter, a modification example will be described.

In the holding portion 80, the second changing member 76 and the third changing member 84 may not extend across the first recording head 32A and the second recording head 32B in plan view. In the holding portion 80, the plurality of third changing members may be arranged in the X direction without forming the through hole 86 in the third changing member 84. In this configuration, for example, the third changing member may be formed in a plate shape having a predetermined thickness in the X direction.

In the holding portions 30, 70, 80, 90, and 110, the number of recording heads 32 may be one or a plurality other than 32. The number of nozzle units 36 is not limited to four, and may be one or a plurality other than four.

The facing surface 56 may be inclined or curved in a direction intersecting with the Y direction.

The changing unit 72 may include only one of the first changing member 74 and the second changing member 76.

The changing unit 82 is not limited to one in which the plurality of through holes 86 are formed in one member, and may be one in which a plurality of members are arranged at intervals in the Z direction. The shape of the through hole 86 is not limited to a rectangle, and may be a circle or an ellipse. The number of through holes 86 is not limited to six, and may be one or a plurality other than six.

The guide surface 85 is not limited to a curved surface, and may be formed of one inclined surface or a plurality of inclined surfaces having different angles with respect to the Y direction.

The liquid is not limited to the ink K and may be water, a cleaning liquid, etc. For example, the holding unit may be a cleaning unit that cleans an object by discharging water. Also in this configuration, water in the form of mist may enter from the gap.

The gas is not limited to the air A and may include, for example, a chlorofluorocarbon gas, etc.

The holding unit is not limited to a serial type that is moved in the X direction like the holding portions 30, 70, 80, 90, and 110, and may be, for example, a line head. Even in the line head, since an air flow is generated along with the movement of the medium M, the entry of the mist MS may occur. The transport direction of the medium M is not limited to the horizontal direction and may be the vertical direction. In this configuration, the bottom wall portion 42 may be disposed as a side wall portion.

What is claimed is:

1. A holding unit held by an device main body, the holding unit comprising:
 at least one discharge unit configured to discharge liquid;
 an accommodating unit including an attachment portion to which the at least one discharge unit is attached, the accommodating unit being configured to accommodate the at least one discharge unit;
 a facing portion having a facing surface facing the attachment portion; and
 a blowing unit configured to blow a gas toward the facing surface so that the gas reaches the discharge unit.

2. The holding unit according to claim 1, comprising
 at least one changing unit configured to change, to a direction toward the attachment portion, a flow direction of the gas blown toward the facing surface.

3. The holding unit according to claim 2, wherein
 a through hole is provided at the changing unit, the through hole extending through the changing unit.

4. The holding unit according to claim 2, wherein
 the at least one discharge unit includes a first discharge unit and a second discharge unit, the first discharge and the second discharge unit being attached to the attachment portion side by side with each other, and the at least one changing unit is disposed extending across the first discharge unit and the second discharge unit when the attachment portion is viewed in plan view.

5. The holding unit according to claim 1, wherein an electronic element portion is accommodated in the accommodating unit, the electronic element portion being configured to generate heat when the electronic element portion is driven, and a cooling portion is provided at the facing portion, the cooling portion being configured to cool the facing portion.

6. A liquid discharge device comprising:

a holding unit;

a device main body configured to hold the holding unit; and a transport unit configured to transport the medium to a position facing the discharge unit, the holding unit including:

at least one discharge unit configured to discharge liquid onto a medium;

an accommodating unit including an attachment portion to which the at least one discharge unit is attached, the accommodating unit being configured to accommodate the at least one discharge unit;

a facing portion having a facing surface facing the attachment portion across the at least one discharge unit; and a blowing unit configured to blow a gas toward the facing surface.

7. The liquid discharge device according to claim 6, comprising:

a moving unit provided at the device main body, the moving unit being configured to move the holding unit in a width direction intersecting a transport direction of the medium; and a control unit configured to control the blowing of the gas by the blowing unit, wherein the blowing unit includes a first blowing unit provided on one side in the width direction and a second blowing unit provided on another side in the width direction, with respect to the at least one discharge unit, and when the moving unit moves the holding unit to the one side in the width direction, the control unit operates the second blowing unit and stops operation of the first blowing unit, and when the moving unit moves the holding unit to the other side in the width direction, the control unit operates the first blowing unit and stops operation of the second blowing unit.

* * * * *